(12) United States Patent  (10) Patent No.: US 8,140,748 B2
Kacin et al. (45) Date of Patent: *Mar. 20, 2012

(54) IT AUTOMATION APPLIANCE IMAGING SYSTEM AND METHOD

(75) Inventors: Martin Kacin, Palo Alto, CA (US); Michael Gray, Dublin, OH (US); Matthew Lewinski, San Francisco, CA (US)

(73) Assignee: Kace Networks, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/074,194

(22) Filed: Mar. 29, 2011

(65) Prior Publication Data

US 2011/0173430 A1   Jul. 14, 2011

Related U.S. Application Data

(63) Continuation of application No. 12/021,143, filed on Jan. 28, 2008, now Pat. No. 7,941,599.

(60) Provisional application No. 60/896,857, filed on Mar. 23, 2007.

(51) Int. Cl.
*G06F 12/00* (2006.01)
(52) U.S. Cl. ......... 711/112; 711/104; 711/170; 711/216
(58) Field of Classification Search ........................ None
See application file for complete search history.

(56) References Cited

U.S. PATENT DOCUMENTS

| 6,317,826 | B1* | 11/2001 | McCall et al. ............... 713/1 |
| 6,625,623 | B1 | 9/2003 | Midgley et al. ............. 1/1 |
| 6,990,660 | B2 | 1/2006 | Moshir et al. |
| 7,673,131 | B2* | 3/2010 | Azzarello et al. ............... 713/2 |
| 7,941,599 | B2* | 5/2011 | Kacin et al. ............... 711/112 |
| 2004/0267716 | A1* | 12/2004 | Prabu et al. ............... 707/3 |
| 2005/0010835 | A1 | 1/2005 | Childs et al. ............... 714/6 |
| 2007/0226249 | A1 | 9/2007 | Kacin et al. |
| 2007/0226259 | A1 | 9/2007 | Kacin et al. |
| 2008/0109396 | A1 | 5/2008 | Kacin et al. |

OTHER PUBLICATIONS

"AdminGuide: Administrator Guide for KBOX, Version 2.1," KACE, Jan. 16, 2006, 143 pages.
"Automated IT Management: KBOX™," KACE, Jan. 2006, 20 pages.
"Help Desk Module: Integrated help Desk Drives Faster Response and Increased User Satisfaction," KBOX by KACE, Jan. 2006, 4 pages.
"Jumpstart Program: Installation Assistance," KBOX by KACE, Jan. 2006, 10 pages.

(Continued)

*Primary Examiner* — Shawn X Gu
(74) *Attorney, Agent, or Firm* — Baker Botts L.L.P.

(57) ABSTRACT

A system, method, and computer program product for harvesting an image from a local disk of a managed endpoint to an image library is provided. In an embodiment of the method for harvesting an image, a managed endpoint is provided with a boot image that causes the endpoint to instantiate a RAM disk and execute the boot image from the RAM disk. The boot image is used to harvest an image by determining data on a local disk of the managed endpoint to be included in the image that are not already stored in the image library. In one embodiment, this is done by comparing hashes calculated on the data on the local disk to hashes of data in the image library. The data not already stored in the image library are then copied to the image library.

12 Claims, 6 Drawing Sheets

OTHER PUBLICATIONS

"Kace Launches New Help Desk Module for Upgraded KBOX™ IT Management Appliance," Press Release, KACE, Jan. 30, 2006 (online) (retrieved May 30, 2007) Retrieved from the internet at URL:http://www.kace.com/about/releases/01_30_06.php.

Pollock, J., "White Paper: Silent Mode Installation Tips and Tricks for Windows," KACE, Sep. 2005, 27 pages.

PCT International Search Report and Written Opinion, PCT US2008/53539, Jul. 22, 2008.

Response to Office Action filed Dec. 1, 2010 in U.S. Appl. No. 12/021,143, 16 pages.

Office Action dated Sep. 3, 2010 in U.S. Appl. No. 12/021,143, 14 pages.

* cited by examiner

US 8,140,748 B2

IT AUTOMATION APPLIANCE IMAGING SYSTEM AND METHOD

CROSS-REFERENCE TO RELATED APPLICATIONS

This application is a continuation of U.S. patent application Ser. No. 12/021,143 Filed Jan. 28, 2008, now U.S. Pat. No. 7,941,599; which claims the benefit of U.S. Provisional Application No. 60/896,857, filed Mar. 23, 2007, which are hereby incorporated in its entirety by reference. U.S. patent application Ser. No. 12/021,143 is related to U.S. patent application Ser. No. 11/689,478, now U.S. Pat. No. 7,814,190, Ser. Nos. 11/689,484, and 11/689,486, now U.S. Pat. No. 7,818,427, all filed Mar. 21, 2007, which are hereby incorporated in their entirety by reference.

FIELD OF THE INVENTION

This invention relates generally to information technology (IT) systems, and more specifically to systems and methods for automating and deploying IT solutions in an enterprise environment.

BACKGROUND OF THE INVENTION

It is often desirable to manage machines within an enterprise. One management task is to copy and store in a library the contents of local disks of multiple managed machines, also referred to as managed endpoints, within the enterprise. This is also referred to as harvesting images of managed machines. An image of a managed machine is a copy of the data stored on the local disk of the machine. If the data stored on the local disk are arranged in files, the image can be a collection of the files. These harvested images can be deployed to other managed machines, possibly after modifying the image. Images are deployed to clone a machine, repair a machine, or reconfigure a machine. The images should be stored efficiently and in a way that they can be easily analyzed and modified.

The above tasks may need to be performed remotely, without a human user physically interacting with the managed machine. In addition, the tasks may need to be performed in difficult circumstances, such as when the local disk is corrupted and the managed machine is unable to boot from it or when a program is running from the local disk that interferes with the ability to read or write to the disk. What is needed are systems and methods for efficiently, remotely, and non-intrusively harvesting and deploying images to disks of managed machines in an enterprise.

SUMMARY

The above need is met by a system, method, and computer program product for harvesting an image from a local disk of a managed endpoint to an image library and for deploying an image to a local disk of a managed endpoint from an image library. In an embodiment of the method for harvesting an image, a managed endpoint is provided with a boot image that causes the endpoint to instantiate a RAM disk and execute the boot image from the RAM disk. The boot image is used to harvest an image by determining data on a local disk of the managed endpoint to be included in the image that are not already stored in the image library. In one embodiment, this is done by comparing hashes calculated on the data on the local disk to hashes of data in the image library. The data not already stored in the image library are then copied to the image library.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION OF THE DRAWINGS

Figure 1:
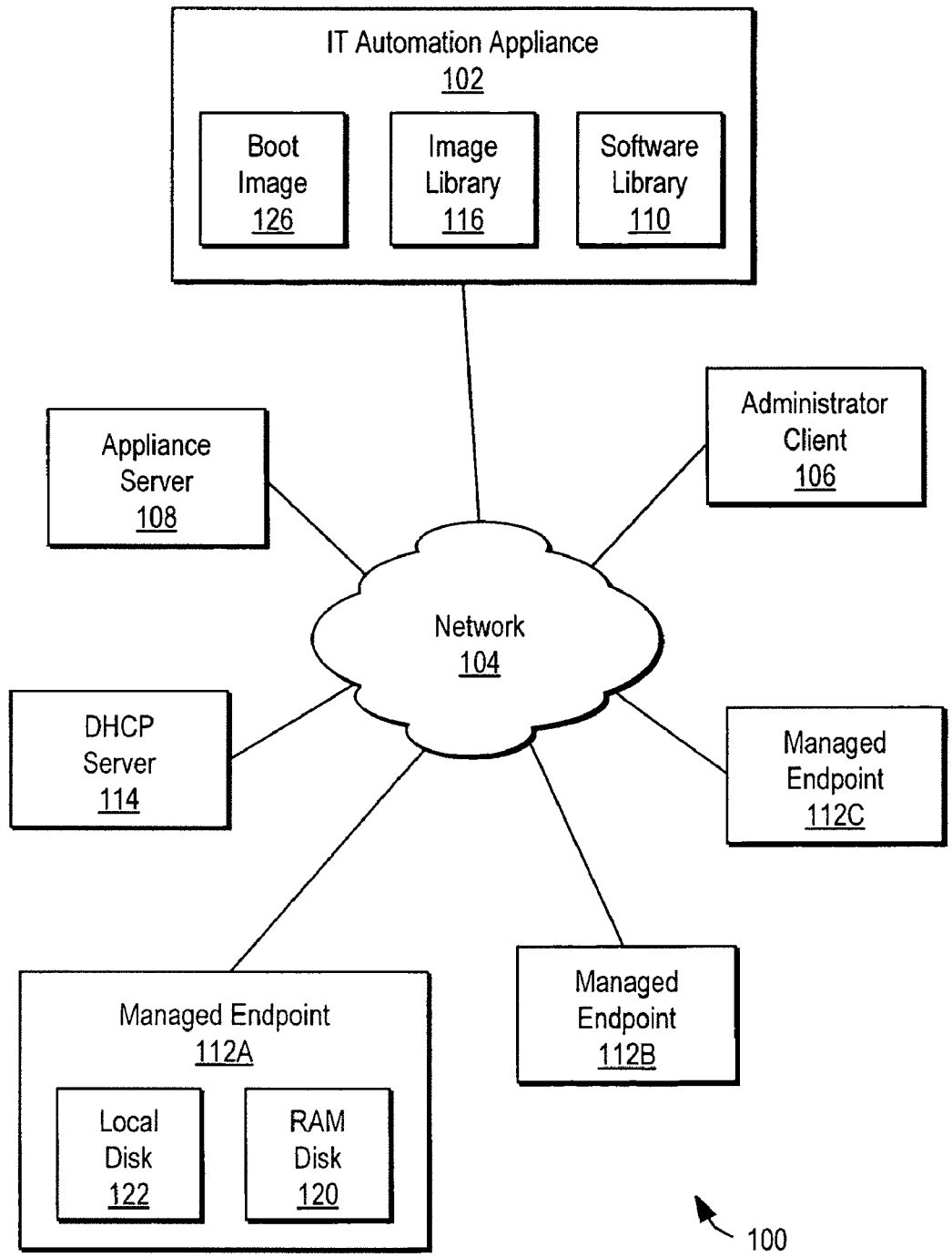
FIG. 1 is a high-level diagram illustrating an enterprise environment in which an IT automation system can be used to carry out IT tasks according to an embodiment of the invention.

FIG. 1 is a high-level diagram illustrating an enterprise environment 100 that includes an information technology (IT) automation appliance 102 (the "appliance") that can be used to carry out various IT processes. The environment 100 also includes an administrator client 106, an appliance server 108, a Dynamic Host Configuration Protocol (DHCP) server 114, and several managed endpoints 112, all connected by a network 104. FIG. 1 shows only a single appliance 102 but embodiments can have multiple appliances. Moreover, FIG. 1 shows only three managed endpoints 112 even though some embodiments may have hundreds or thousands of such endpoints.

The appliance 102 manages IT processes across the enterprise environment 100 on the managed endpoints 112. In some embodiments, the appliance 102 causes a managed endpoint 112 to boot from a boot image it receives over the network 104. Once the managed endpoint 112 is so booted, the appliance can 102 perform functions that might be difficult to perform if the endpoint were booted from its local disk, such as harvesting files from and/or deploying files to the endpoint.

In one embodiment, the appliance 102 includes a boot image library 126, an image library 116, and a software library 110. The boot image library 126 stores one or more boot images for use in booting the managed endpoints 112. The boot image contains machine instructions that, when executed on an endpoint 112, causes the endpoint to instantiate a RAM disk (i.e., a virtual disk drive stored in random access memory), store the boot image on the RAM disk, and boot the endpoint from the image on the RAM disk. The boot image may contain an operating system such as LINUX and various application programs that run in this operating system. The boot image may also contain device drivers that enable it to run on managed endpoints with various hardware configurations.

Once the endpoint 112 is booted from the boot image, the booted endpoint interacts with the appliance 102 to perform administrative tasks such as harvesting an image from a local disk 122 of the endpoint and/or deploying an application image to the local disk. In one embodiment, the boot image causes the endpoint to present options for carrying out the various administrative tasks to a user by showing a menu on the display of the managed endpoint and allowing the user to choose an option. Some examples of menu options are: Harvest image from disk; Deploy harvested image to disk; Launch recovery console.

In one embodiment, a menu option is automatically selected if the user does not choose an option within a certain amount of time. In other embodiments, the boot image causes the endpoint 112 to select an option and/or perform another option automatically without presenting a menu to a user.

In one embodiment, the image library 116 stores images of the local disks 122 (i.e., copies of the contents of the disks) of endpoints 112. The image library 116 can be used for various administrative tasks performed by the IT automation appliance 102. An administrator can use the appliance 102 to view the images to better understand the configurations of the various endpoints 112 in the environment 100. The contents of the image library 116 can be summarized as desired and presented to the administrator. For example, the administrator can view the percentage of space taken on the local disks 112 of all endpoints 112 by certain operating system files. The administrator can also view files that are common or different between various endpoints 112.

In one embodiment, the image library 116 is used for deployments to the endpoints 112. In a deployment, an image in the image library 116 is copied to the local disk 122 of an endpoint 112. The image may or may not have been originally harvested from that endpoint 112. Deployments can be used to replace a corrupted file system on an endpoint 112 with a known working image. A deployment can also be used to clone a file system from one endpoint 112 to another. A partial deployment may be performed to copy only a portion of the image to the local disk 122. Also, the image can be edited before deployment. For example, an image harvested from one endpoint 112A may be deployed to another endpoint 112B after modifying the image to include different configuration information appropriate for endpoint 112B. Editing of an image can be performed using image editing tools provided by the appliance 102.

The types of endpoint images stored in the image library in various embodiments include partition-based images, sector-based images, cluster-based images, and file-based images. In a partition-based image, the separate partitions of the local disk 122 are stored in the image library 116. In a sector-based image, sectors of the local disk 122 are stored in the image library 116. In a file-based image, files from the local disk 122 are stored in the image library 116. Though the partitions, sectors, or files in the image library 116 can be manipulated separately, the image library also contains information that links the partitions, sectors, or files together to form images. The partition-based, sector-based, or file-based images can be optimized to a particular type of file system such as NTFS, FAT, EXT2, or EXT3. The optimization can result in smaller images, faster copying, or easier editing, for example. Additionally, data compression algorithms can be applied to the images in the image library 116 to compress them.

An embodiment of the software library 110 stores device drivers and/or other types of software to enable the support of endpoints 112 with varying hardware configurations. In one embodiment, the appliance 102 includes certain device drivers from the library 110 with the boot image 126 when sending it to an endpoint 112 so that the endpoint can properly run the image. The boot image 126 can also download software from the library 110 to perform required tasks on the endpoint 112, such as harvesting an image of the local disk 122. This software can communicate with the appliance 102 and receive user input through the appliance so that a user does not need to be at the endpoint 112. In one embodiment, the endpoint 112 mounts a drive exported by the appliance 102 containing the software library 110 to access the library.

In one embodiment, the appliance 102 is controlled by an administrator via an administrator client 106. The administrator client 106 communicates with the appliance 102 over the network 104 to provide commands to the appliance from the administrator and to receive output from the appliance. For ease of explanation, this description refers to the administrator interacting directly with the appliance 102, but it is implied that the user can interact with the appliance via the administrator client 106.

In one embodiment, the appliance 102 communicates with an appliance server 108 that in turn communicates with the endpoints 112. The server 108 can be configured to efficiently send and receive large amounts of data and can have a large data storage capacity. As a result, one or more of the boot image library 126, the image library 116, and the software library 116 can be stored on and served by the appliance server 108. For ease of explanation, the description below refers to the appliance 102 communicating with the endpoints 112, but it is implied that the server 108 under control of the appliance 102 can communicate with the endpoints 112 instead.

The DHCP server 114 assists in the boot process of the endpoints 112. In one embodiment, when an endpoint 112 initially boots, it communicates with the DHCP server 114 to request and obtain a unique Internet Protocol (IP) address or other network address for communicating on the network 104. An embodiment of the DHCP server 114 also provides the endpoint 112 with boot instructions causing the endpoint to obtain, and boot from, a boot image stored in the boot image library 126. In some embodiments, the DHCP server functionality is integrated into the appliance server 108 or the automation appliance 102.

Managed endpoints 112 are machines running in the enterprise environment 100 and include, for example, desktop and notebook computer systems, switches and routers, printers, mobile telephones, personal digital assistants, and/or other networked electronic devices found in the enterprise environment 100. In one embodiment, at least one of the managed endpoints includes a local disk 122 and a random access memory (RAM) disk 120. The local disk 122 is a persistent storage device and in one embodiment is a hard drive. The RAM disk 120 is a virtual storage device that emulated in a volatile memory (e.g., RAM) of the endpoint 112. The RAM disk 120 acts like a physical disk; files can be read from or written to the RAM disk 120 in a manner similar to files on the local disk 122. The RAM disk 120 provides the managed endpoint 112 with a local file system from which to run programs and perform other tasks without requiring use of the physical local disk 122.

In one embodiment, the endpoint 112 supports the PXE (Preboot eXecution Environment) boot protocol. This protocol causes the endpoint 112 to seek a PXE redirection service at the initial stage of the boot sequence. The PXE redirection service is provided by the DHCP server 114 and provides the endpoint 112 with a network address and file path to an appropriate boot image in the library 126. The endpoint 112 then requests the boot image from the appliance 102, and the appliance sends a copy of a boot image in response.

In one embodiment, the boot image, when executed by the endpoint 112, initially causes the endpoint to instantiate the RAM disk 120 and store the boot image there. The endpoint 112 then boots from the boot image in the RAM disk 120. As a result, the managed endpoint 112 is booted up based on boot image 126 provided by the appliance 102, and is booted in a manner that does use the local disk 122. Booting from the RAM disk 120 in this manner is advantageous for a variety of reasons. For example, this technique allows booting of the endpoint 112 even if the local disk 122 is corrupted and cannot be used for booting. In addition, booting from the RAM disk 120 allows the endpoint 112 to perform its normal operations while providing unfettered access to the local disk 122. Operating system and/or application programs that might require locked files or otherwise prevent certain operations on the local disk 122 are instead run from the RAM disk 120. Thus, operations on the local disk 122 that might be prohibited if the endpoint 112 were booted from the local disk are allowed in the RAM disk boot embodiment.

As mentioned above, a recovery console can be launched on the managed endpoint 112. The recovery console can be launched by a boot image from the appliance 102 that runs on a RAM disk 120 of the managed endpoint 112. The recovery console allows an administrator to view the contents of a local disk 122 of the managed endpoint 112 and make changes to the contents of the local disk. This can include harvesting an image, deploying an image, examining or modifying individual files, and reinstalling an operating system on the local disk 122. Once the changes are made, the managed endpoint 112 can be booted normally from its local disk 122 to resume normal operation. A recovery console is useful when it is currently impossible or undesirable to boot the managed endpoint from its local disk 122.

In one embodiment, the boot image contains an operating system from which the recovery console runs. The operating system can be customized to run on a particular managed endpoint 112 and the boot image can include device drivers to enable the operating system to run on the endpoint. After the boot image is loaded on the RAM disk 120, it starts this operating system and optionally starts other application programs that enable an administrator to perform functions on the local disk 122 of the managed endpoint. These applications may include various graphical user interfaces, file editors, and disk analyzers.

The recovery console may enable an administrator to access further application programs from the appliance 102 by mounting a file system of the appliance as described above. The recovery console can also automatically detect various device drivers and application programs that would be useful to run on the endpoint and download those drivers and programs from the appliance 102.

An administrator can interact with the recovery console directly from the managed endpoint 112, for example using a keyboard and display provided by the endpoint. The administrator can also interact with the recovery console remotely, for example from the appliance 102 or an administrator client 106. In one embodiment, the administrator uses the Virtual Network Computing (VNC) graphical desktop sharing system to remotely control the managed endpoint 112. When using VNC or a similar system, the administrator is able to perform administrative tasks on the managed endpoint by remotely controlling the endpoint 112.

The network 104 represents the communication pathways among the other entities illustrated in FIG. 1. In one embodiment, the network 104 is a local area network (LAN) maintained by an enterprise. The network 114 can also utilize public communications links such as the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), the trivial file transfer protocol (TFTP), etc. The data exchanged over the network 114 can be represented using technologies and/or formats including the HTML, the extensible markup language (XML), the Extensible Hypertext markup Language (XHTML), etc. In addition, all or some of links can be encrypted using conventional encryption technologies such as the secure sockets layer (SSL), HTTP over SSL (HTTPS), and/or virtual private networks (VPNs). Other embodiments use custom and/or dedicated data communications technologies instead of, or in addition to, the ones described above.

Figure 2:
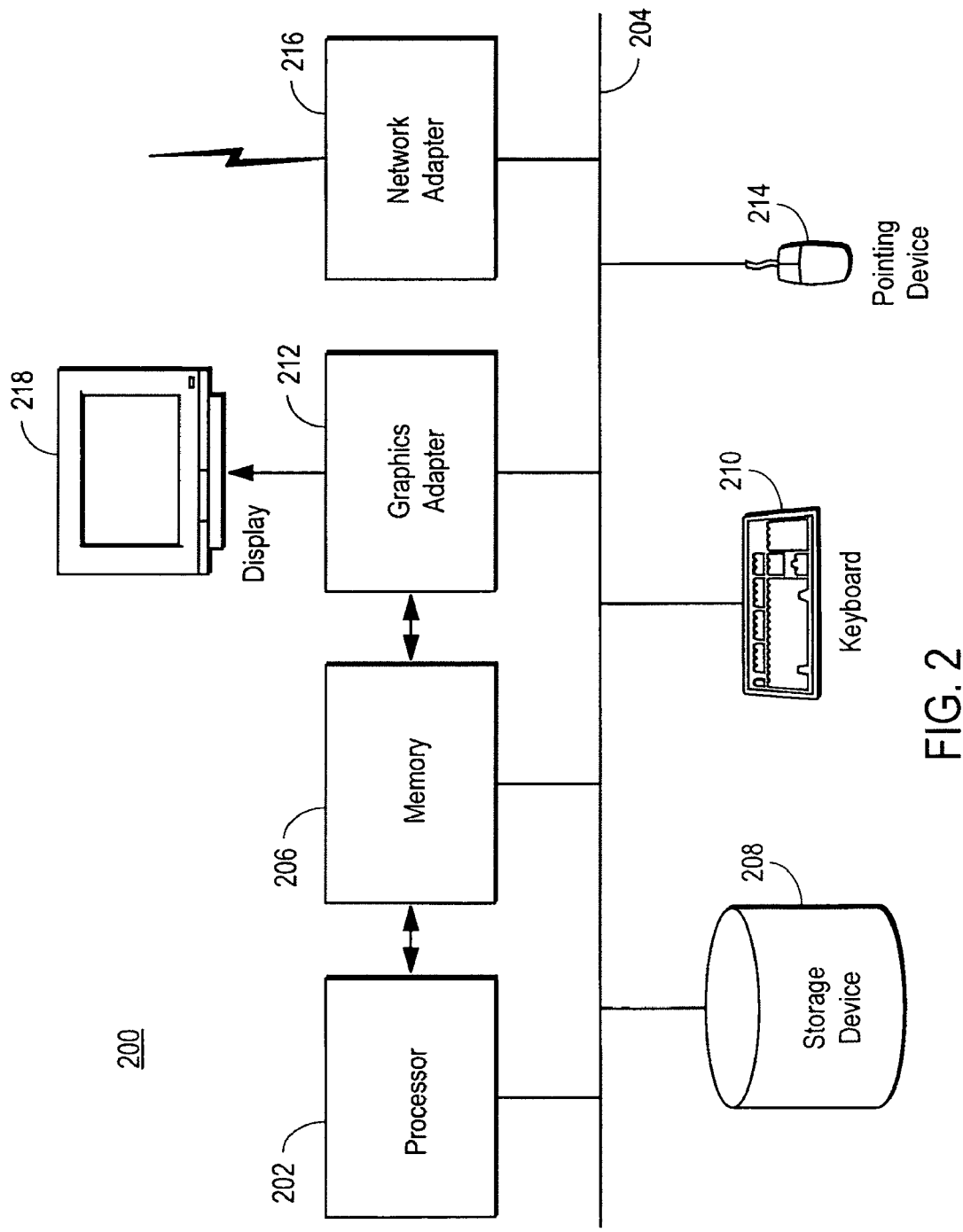
FIG. 2 is a block diagram illustrating a computer that can serve as an embodiment of an IT automation appliance, administrator client, appliance server, DHCP server, or managed endpoint in accordance with an embodiment of the invention.

FIG. 2 is a block diagram illustrating a computer 200 that can serve as an embodiment of the appliance 102, administrator client 106, appliance server 108, DHCP server 114, or managed endpoints 112. Illustrated are at least one processor 202 coupled to a bus 204. Also coupled to the bus are a memory 206, a storage device 208, a keyboard 210, a graphics adapter 212, a pointing device 214, and a network adapter 216. A display 218 is coupled to the graphics adapter 212. The storage device 208 is a device such as a hard drive, CD or DVD drive, or flash memory device, and holds files containing executable code and/or data utilized during the operation of the computer 200. The memory 206, in one embodiment, is a random access memory (RAM) and holds instructions and data loaded from the storage device 208, generated during processing, and/or from other sources.

Computers acting in different roles may have different and/or additional elements than the ones shown in FIG. 2. For example, a computer 200 acting as the appliance server 108 may have greater processing power and a larger storage device than a computer acting as a managed endpoint 112. Likewise, a computer 200 acting as the appliance server 108 may lack devices such as a display 218 and/or keyboard 210 that are not necessarily required to operate it.

The computer 200 executes one or more operating systems such as a variant of MICROSOFT WINDOWS or LINUX. In general, the operating system executes one or more application programs. The operating system and application programs executed by the computer are formed of one or more processes.

Figure 3:
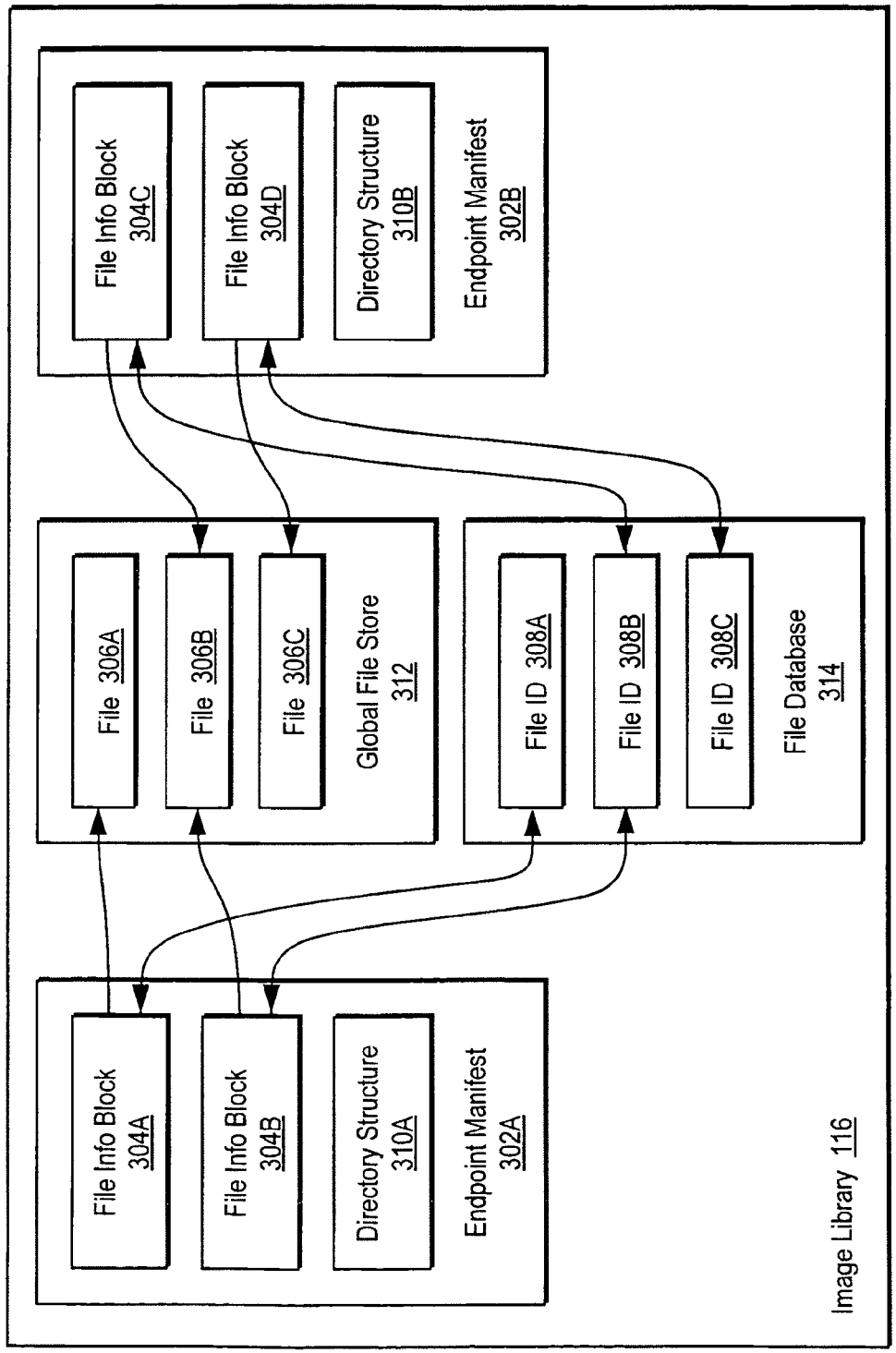
FIG. 3 illustrates the contents of a file-based image library in accordance with an embodiment of the invention.

FIG. 3 illustrates the contents of a file-based image library 116, in one embodiment. As mentioned above, in a file-based image library 116, the files from various endpoints 112 are stored individually. This allows an administrator to easily analyze and edit the individual files from the endpoints 112. Also, as discussed below, certain optimizations enable the file-based image library 116 to have decreased storage needs on the appliance 102 and to copy less data over the network 104 during image harvesting and deployment.

The file-based image library 116 includes a global file store 312 that includes files 306 from all endpoints 112 that have been harvested. Files that exist identically on the local disks 122 of multiple endpoints 112 will be contained only once in the global file store 312. This can result in significant space savings in the image library 116 if multiple endpoints 112 contain similar files. For example, if several endpoints 112 are workstations running the same MICROSOFT WINDOWS operating system, the workstations will all contain several common operating system files, but the global file store 312 will contain only a single copy of these common files.

The file-based image library 116 includes an endpoint manifest 302 for each harvested endpoint 112. The endpoint manifest 302 contains a file information block 304 for each file harvested from the local disk 122 of the endpoint 112. An endpoint manifest 302 and files 306 pointed to by the manifest can be considered a file-based image of a particular endpoint 112. A file information block 304 includes the name of a file 306, the size of the file, and access control list (ACL) information about the file that can specify file ownership and read/write permissions. The file information block 304 also includes a hash, also referred to as a digest or fingerprint, of the file 306 that serves to uniquely identify the file. The hash is a value produced by applying a hash function to the file data. The hash function is chosen so that it is highly unlikely that two different files will produce the same hash. An example hash function is the Message-Digest 5 (MD5) algorithm that takes a file as an input and produces a 128-bit hash as an output.

Additionally, the file information block 304 includes a pointer to the actual file stored in the global file store 312. Since multiple endpoints 112 may have the same file that is stored only once in the global file store 312, multiple file information blocks 304 may point to the same file 306. For example, in FIG. 3, file information blocks 304B and 304C both point to file 306B. It is possible for file information blocks 304B and 304C to have different names and ACL information for the same file 306B depending on how the file was stored on the two endpoints 112 corresponding to manifests 302A and 302B.

The endpoint manifest 302 also includes the directory structure 310 on the local disk 122 of the endpoint 112. The directory structure 310 can be used in an image deployment to create the required directories on the endpoint 112 and to place the files 306 in the correct directories.

The file database 314 contains file identifiers 308 for each file 306 in the global file store 312. Each file identifier 308 contains links to all file information blocks 304 corresponding to that file identifier. As a result, the file database 314 can be used to produce a list of all unique files 306 currently in the file-based image library 116 along with information about each file, such as the endpoints 112 where it is located, and its filename on each such endpoint. Such a list may be useful for IT administration purposes. Additionally, the file database 314 can be used to search for a file matching certain criteria, such as a particular filename or file size. Each file identifier 308 also contains a reference count for the corresponding file. The reference count is the number of file information blocks 304 that point to the file 306 corresponding to the file identifier 308. When a new pointer is added, the reference count is increased, and when a pointer is removed, the reference count is decreased. When the reference count decreases to zero, the file 306 and file identifier 308 can be deleted from the image library 116.

Figure 4:
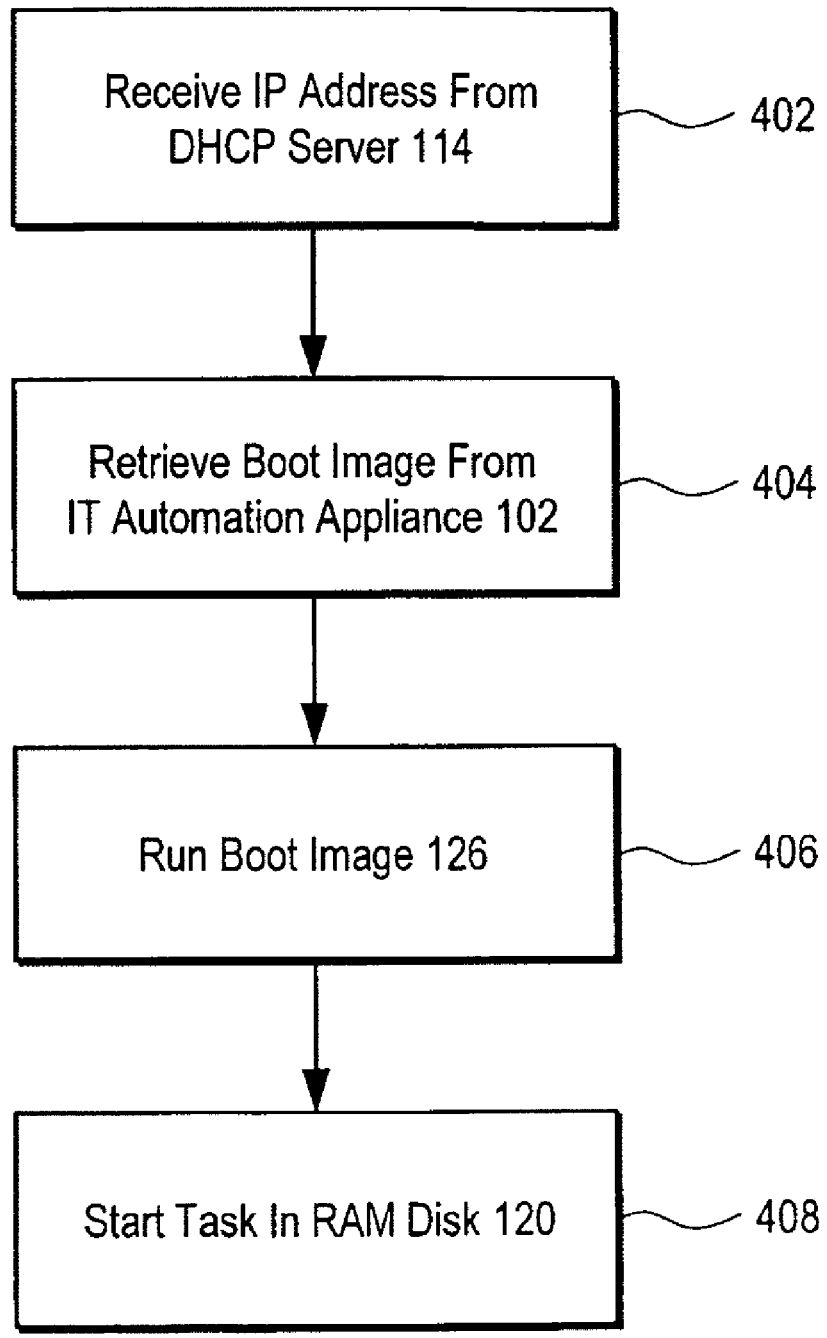
FIG. 4 is a flowchart illustrating a method of booting a managed endpoint in accordance with an embodiment of the invention.

FIG. 4 is a flowchart illustrating a method of booting a managed endpoint 112, in one embodiment. Some embodiments may perform additional and/or different parts of the method than those shown in FIG. 4. In addition, the method parts may be performed in different orders.

As mentioned above, an embodiment of the endpoint 112 performs a PXE boot. Initially, the managed endpoint 112 requests and receives 402 an IP address from the DHCP server 114. In addition, the endpoint receives the location of a boot image from the DHCP server. The endpoint 112 retrieves 404 the boot image, loads it into memory and runs 406 it. In one embodiment, the boot image causes the endpoint 112 to run the boot image from a RAM disk 120. The boot image 126 then starts 408 an administrative task such as harvesting an image or deploying an image. The running boot image will optionally display a menu to the user, allowing the user to choose what action to perform on the endpoint 112.

Figure 5:
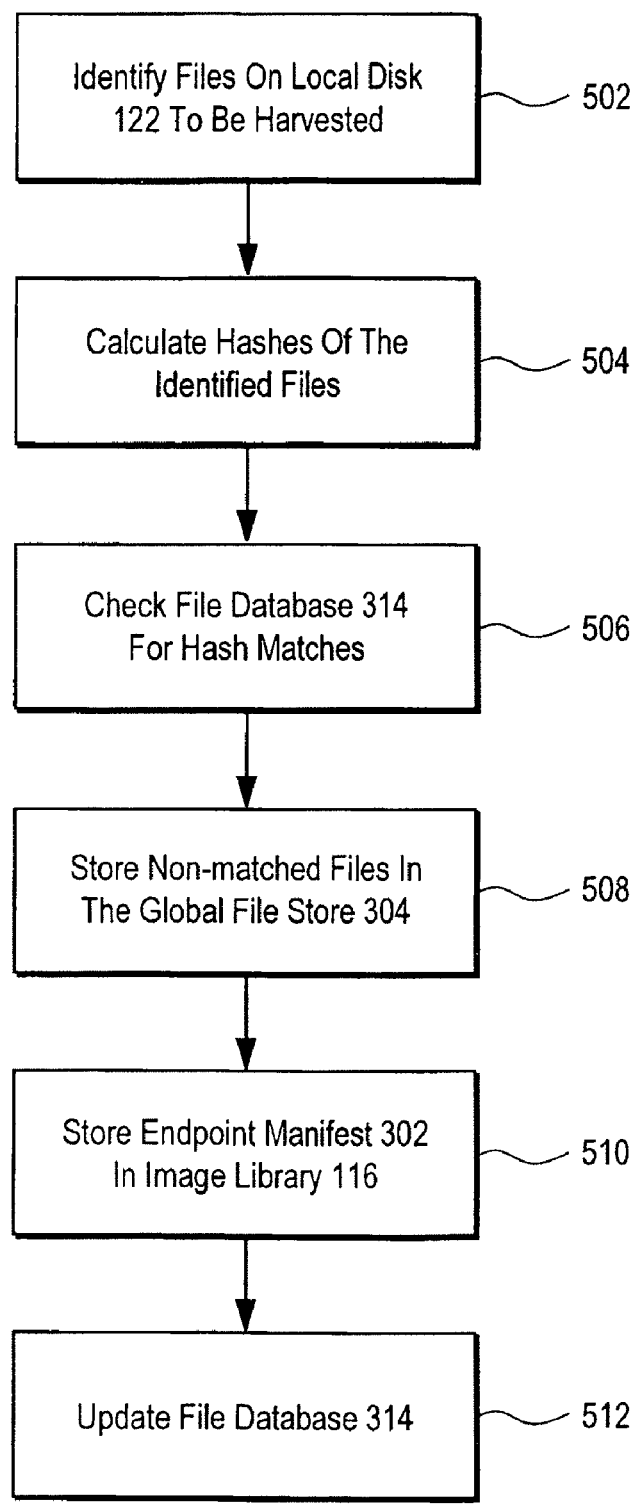
FIG. 5 is a flowchart illustrating a method of harvesting a file-based image from the local disk of an endpoint in accordance with an embodiment of the invention.

FIG. 5 is a flowchart illustrating a method of harvesting a file-based image from the local disk of an endpoint 112. Parts of the method may be performed on the endpoint 112 and parts of the method may be performed on the appliance 102. Some embodiments may perform additional and/or different parts of the method than those shown in FIG. 5. In addition, the parts of the method may be performed in different orders.

Initially, the files to be harvested from the local disk 122 are identified 502. For example, the files to be harvested can be based on a list provided by an administrator or can be all the files on the disk 122. Hashes are calculated 504 for each of the identified files. The file database 314 is checked 506 for hash matches. This can be done by iterating through each of the file identifiers 308 in the file database 314 and obtaining the hash from a file information block 304 linked to the file identifier. More efficient implementations are possible to perform this search, such as indexing the hashes.

A match indicates that the file is already in the global file store 312 and that the file does not need to be copied. As a result, non-matched files are copied from the endpoint 112 over the network 104 and stored 508 in the global file store 312. A manifest 302 for the endpoint 112 is created containing file information blocks 304 for identified files from the endpoint and a directory structure 310 for the endpoint. The manifest 302 is stored 510 in the image library 116 and pointers from the file information blocks 304 to files 306 in the global store 312 are constructed. The file database 314 is updated 512 to contain file identifiers 308 for newly added files 306. Links are created from the file identifiers 308 to the file information blocks 304 and the reference count in the file identifiers are increased by one.

Figure 6:
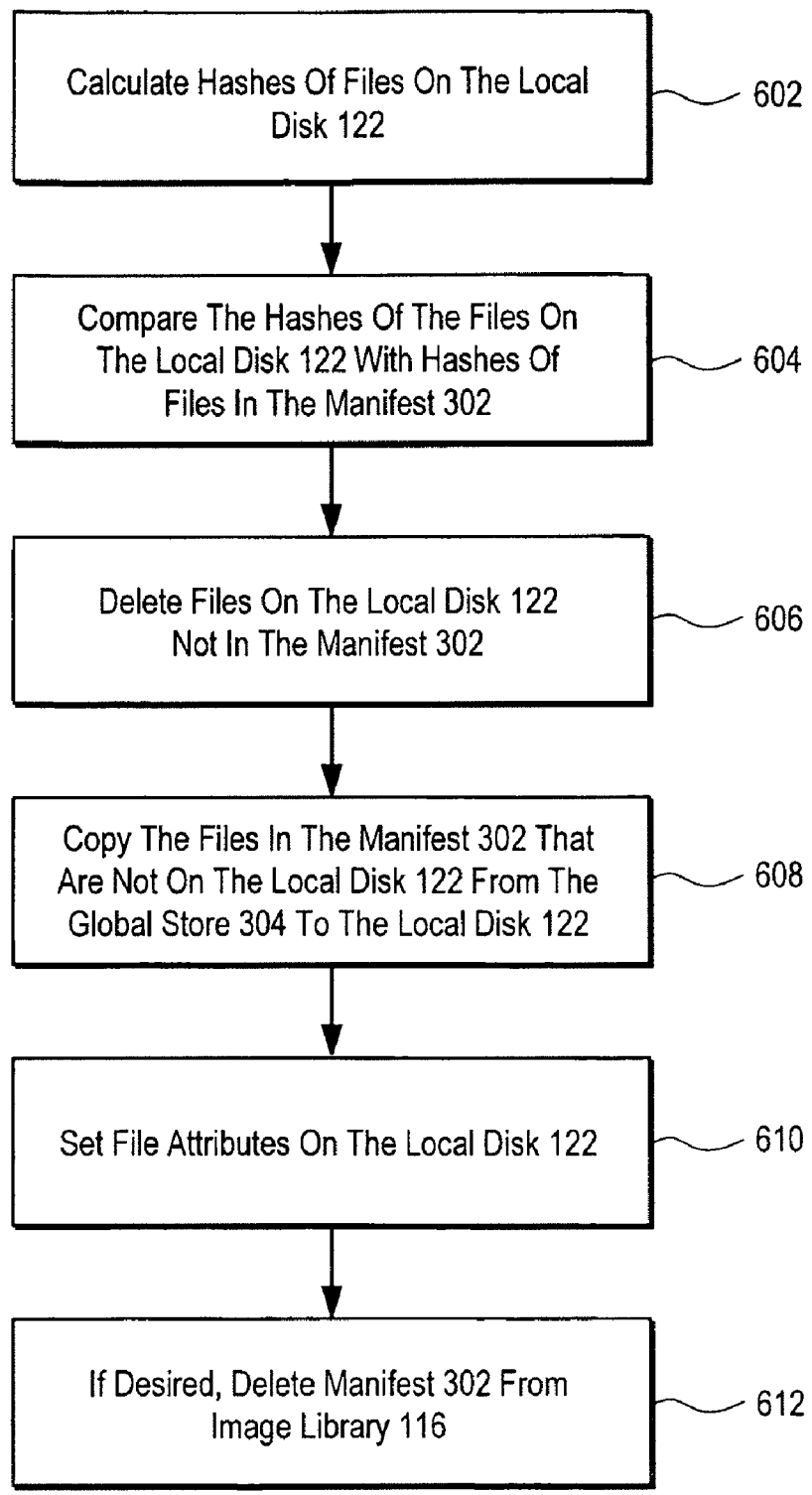
FIG. 6 is a flowchart illustrating a method of deploying a file-based image to the local disk of an endpoint in accordance with an embodiment of the invention.

FIG. 6 is a flowchart illustrating a method of deploying a file-based image to the local disk 122 of an endpoint 112. Some embodiments may perform additional and/or different parts of the method than those shown in FIG. 6. In addition, the parts of the method may be performed in different orders.

In a deployment, the contents of the local disk 122 are modified so that the local disk contains the files 306 and directory structure 310 specified in a particular manifest 302 in the image library 116. Initially, hashes of files on the local disk 122 are calculated 602. These hashes are compared 604 with hashes in the file information blocks 304 stored in the manifest 302 to determine files that are common to both the local disk and the manifest. Files on the local disk 122 that are not in the manifest 302 are deleted 606 from the local disk. Files in the manifest 302 that are not on the local disk 122 are copied 608 from the global store 312 to the local disk. File attributes on the local disk 122 are set 610 according to the attributes stored in the file information block 304. Optionally, the manifest 302 is deleted 612 from the image library 116. If the manifest 302 is deleted, links from file identifiers 308 to the manifest are removed, reference counts in the identifiers are decreased, and files 306 whose reference counts have dropped to zero are deleted from the global file store 312.

As can be seen, the methods for harvesting a file-based image and deploying a file-based image reduce the number of files that need to be copied and transferred over the network 104. When harvesting from an endpoint 112, the files encountered on the endpoint are not copied if they already exist in the image library 116. When deploying to an endpoint 112, files are not copied from the image library 116 if they already exist at the endpoint. Hashes are used when comparing files, since filenames or other file attributes can vary for the same file. Files can be transmitted over the network 104 in a compressed format to further decrease network resources used. The methods also reduce the storage required by the image library 116 by storing only unique files in the global file store 312.

When harvesting the first endpoint 112 with an empty global file store 312, all of the initial files encountered on the endpoint are new and are sent over the network 104 and stored in the global file store. The harvesting of the second and subsequent endpoints 112 will be faster if these endpoints share common files with the first endpoint. To avoid slowness or high network usage during harvesting of the first endpoint 112, it is possible to preload the global file store 312 with files 306 that will likely be encountered on the first endpoint, and to update the file database 308 with hashes of these files. With this preloading, even the first endpoint 112 can be harvested relatively quickly because some of its files will already be in the global file store 312.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer program product having a computer-readable medium having computer program instructions recorded thereon for managing a managed endpoint, comprising:
   a module for providing the managed endpoint with a boot image via a network,
   a module for instantiating, by instructions stored in the boot image, a random access memory (RAM) disk in a memory of the endpoint,
   a module for storing, by instructions stored in the boot image, the boot image in the RAM disk, and
   a module for executing, by instructions stored in the boot image and executed from the RAM disk, the boot image from the RAM disk.

2. A computer program product according to claim 1, further comprising a module for harvesting, by instructions stored in the boot image and executed from the RAM disk, an image from a local disk of the managed endpoint.

3. A computer program product according to claim 1, further comprising a module for deploying, by instructions stored in the boot image and executed from the RAM disk, an application image to a local disk of the managed endpoint.

4. A computer program product according to claim 3, wherein the application image is deployed from an image library communicatively coupled to the managed endpoint via a network.

5. A computer program product according to claim 1, further comprising:
   a module for communicatively coupling, by instructions stored in the boot image and executed from the RAM disk, the managed endpoint to an administrator client via a network; and
   a module for communicating, by instructions stored in the boot image and executed from the RAM disk, information regarding the managed endpoint.

6. A computer program product according to claim 1, further comprising:
   a module for communicatively coupling, by instructions stored in the boot image and executed from the RAM disk, the managed endpoint to an administrator client via a network; and
   a module for providing, by instructions stored in the boot image and executed from the RAM disk, a user interface at the administrator client configured to allow a user of the administrator client to remotely control the managed endpoint.

7. A computer program product according to claim 1, further comprising:
   communicatively coupling, by instructions stored in the boot image and executed from the RAM disk, the managed endpoint to an administrator client via a network; and
   providing, by instructions stored in the boot image and executed from the RAM disk, a user interface at the administrator client configured to allow a user of the administrator client to remotely control the managed endpoint.

8. A computer-implemented method for managing a managed endpoint, comprising:
   providing the managed endpoint with a boot image via a network,
   instantiating, by instructions stored in the boot image, a random access memory (RAM) disk in a memory of the endpoint,
   storing, by instructions stored in the boot image, the boot image in the RAM disk, and
   executing, by instructions stored in the boot image and executed from the RAM disk, the boot image from the RAM disk.

9. A computer-implemented method according to claim 8, further comprising a harvesting, by instructions stored in the boot image and executed from the RAM disk, an image from a local disk of the managed endpoint.

10. A computer-implemented method according to claim 8, further comprising deploying, by instructions stored in the boot image and executed from the RAM disk, an application image to a local disk of the managed endpoint.

11. A computer-implemented method according to claim 10, wherein the application image is deployed from an image library communicatively coupled to the managed endpoint via a network.

12. A computer-implemented method according to claim 8, further comprising:
   communicatively coupling, by instructions stored in the boot image and executed from the RAM disk, the managed endpoint to an administrator client via a network; and
   communicating, by instructions stored in the boot image and executed from the RAM disk, information regarding the managed endpoint.

* * * * *